United States Patent
Lawson

[11] Patent Number: 5,829,849
[45] Date of Patent: Nov. 3, 1998

[54] UNDERCARRIAGE ASSEMBLY FOR ATTACK-TYPE MACHINE

[75] Inventor: Roger E. Lawson, Brimfield, Ill.

[73] Assignee: Caterpillar Inc., Peoria, Ill.

[21] Appl. No.: 757,221

[22] Filed: Nov. 27, 1996

[51] Int. Cl.$^6$ .................................................. B62D 55/18
[52] U.S. Cl. .......................... 305/193; 305/196; 305/199; 305/137
[58] Field of Search ..................................... 305/202, 199, 305/203, 102, 193, 194, 195, 196, 197, 200, 122, 59, 103, 104, 136, 137, 138, 125; 301/64.7

[56] References Cited

U.S. PATENT DOCUMENTS

| | | | |
|---|---|---|---|
| Re. 34,909 | 4/1995 | Kindel et al. | 305/24 |
| 1,304,428 | 5/1919 | White . | |
| 1,317,103 | 9/1919 | Rimailho . | |
| 2,167,039 | 7/1939 | Ekbou | 305/199 X |
| 2,789,438 | 4/1957 | Hutchinson | 74/242.1 |
| 2,791,256 | 5/1957 | Sinclair | 152/47 |
| 2,926,969 | 3/1960 | Ashley, Jr. | 305/138 X |
| 2,970,867 | 9/1961 | Ruf | 305/56 |
| 3,533,662 | 10/1970 | Richards et al. | 305/27 |
| 3,997,217 | 12/1976 | Bandet et al. | 301/5 R |
| 4,022,072 | 5/1977 | Chagawa et al. | 305/199 X |
| 4,120,537 | 10/1978 | Roley et al. | 305/59 X |
| 4,126,359 | 11/1978 | Holze | 305/59 X |
| 4,402,555 | 9/1983 | Ogaki et al. | 305/139 X |
| 5,183,318 | 2/1993 | Taft et al. | 305/39 |
| 5,207,489 | 5/1993 | Miller | 305/137 |
| 5,340,206 | 8/1994 | Young | 305/24 |

FOREIGN PATENT DOCUMENTS

| | | | |
|---|---|---|---|
| 6138068 | 10/1981 | Japan | 305/137 |

*Primary Examiner*—Russell D. Stormer
*Attorney, Agent, or Firm*—William C. Perry

[57] ABSTRACT

In the operation of conventional track assemblies it is common for an idler to have a pair of laterally extending wear treads to engage and support the wear rails defined by the track links of the track assembly as it is driven thereabout. This ultimately creates an arcuate wear pattern on the wear rails of the track links creating an extremely rough ride when the wear rails contact the track rollers suspended from a track roller frame. The present invention provides an idler member having a flange member that defines a raised center portion. The raised center portion contacts a roller bushing that extends between a pair of chain assemblies defined by the track assembly to support the track assembly as it is rotated therearound. The raised center portion further provides a pair of tapered side portions that are positioned between the chain assemblies and to provide lateral guiding thereof.

13 Claims, 3 Drawing Sheets

UNDERCARRIAGE ASSEMBLY FOR ATTACK-TYPE MACHINE

TECHNICAL FIELD

This invention relates to track assemblies for a track-type machine and more particularly to an idler for use with a track assembly utilizing roller bushings.

BACKGROUND ART

Conventional track assemblies utilized on track-type machines have typically consisted of a pair of parallel track chains comprised of a plurality of link members that are interconnected by laterally disposed track pins. A track bushing is commonly disposed about the pin and is secured to the links for relative rotation with respect to the pin. The bushing is adapted to engage a drive sprocket that propels the track assembly about a track roller frame and ultimately provides the tractive force necessary to power the machine. In recent times, the bushing has taken the form of a "roller" bushing and is not fixed to the links but rather is allowed to rotate about the pin relative to both the pin and the links. This was done to reduce the wear between the sprocket and the bushings which has been known to be quite severe, especially in the abrasive conditions in which track-type machines commonly operate.

Another source of wear occurs on the link members of the track chain. The link members commonly have a wear rail defined on an inwardly directed surface that engages the wear surfaces on the guide rollers and the idlers mounted to the track roller frame. As the track assembly rotates about the track frame, the wear rails of the links are continually brought into contact with the wear surfaces and are also subjected to severe wear. This can be especially critical at the interface between the idlers and the wear rails of the links. Conventional idlers are relatively large diameter wheels that have a pair of laterally extending wear surfaces, or treads, which are positioned to contact the wear rails of the links. A center flange is defined on the idler and is positioned between the treads and runs between the links to act as a lateral guide for the track chain. The track assembly may have a single idler in the case of a generally oval track or there may be a pair of idlers in the case of a triangular track configuration. As the generally planar surface of the wear rails is continually brought into contact with the circular idler wheel or wheels, an arcuate surface begins to form on the wear rails. This wear, of course, is accelerated in more abrasive soils. When this type of wear occurs, the arcuate wear surface will create a highly uneven "platform" for the machine as the track chain lays on the ground and the guide rollers roll across the guide rails. This results in an extremely rough ride which is not only uncomfortable for the operator of the machine, it is also quite fatiguing.

The present invention is directed to overcoming one or more of the problems set forth above.

DISCLOSURE OF THE INVENTION

In one aspect of the present invention, an idler is adapted for use with a track assembly that has a plurality of link members connected together to form a pair of parallel, continuous chain members, by a plurality of laterally extending pin members having a bushing member mounted for relative rotation about the pin members. The idler includes a hub portion and a flange member, having a raised center portion. The flange member extends from the hub in a radial direction and the raised center portion is adapted for engagement with the rotating bushing disposed about the pin.

In another aspect of the present invention, a track assembly is provided that includes a frame assembly that has a first and second end portion. First and second track chains, each having a plurality of track links, are provided that are positioned in spaced parallel relation to one another. A plurality of pin members extend laterally between the first and second track chains and interconnect them. A plurality of roller bushings are positioned about the pin members and are adapted to rotate relative to the pin members and the track links. At least one idler member having an outer flange member defining a raised center portion, is mounted on at least one end of the track frame assembly. The idler member is adapted for engagement with the roller bushing to guide the track assembly for relative movement with respect to the frame assembly.

With a track assembly having an idler as set forth above, the contact between the wear rails of the track links and the idler is eliminated. Since the guiding contact occurs between the rounded surface of the idler and the rounded surface of the bushing, the integrity of the substantially planar surface of the wear rail is maintained. Ultimately, this results in a relatively smooth interface between the guide rollers of a track assembly and the track chain, and therefore an improved ride for the machine. It also eliminates the transmission of vibration and rythmic forces into the surrounding frames and related structure which is known to be deleterious to the life of these structures.

BEST MODE FOR CARRYING OUT THE INVENTION

Figure 1:
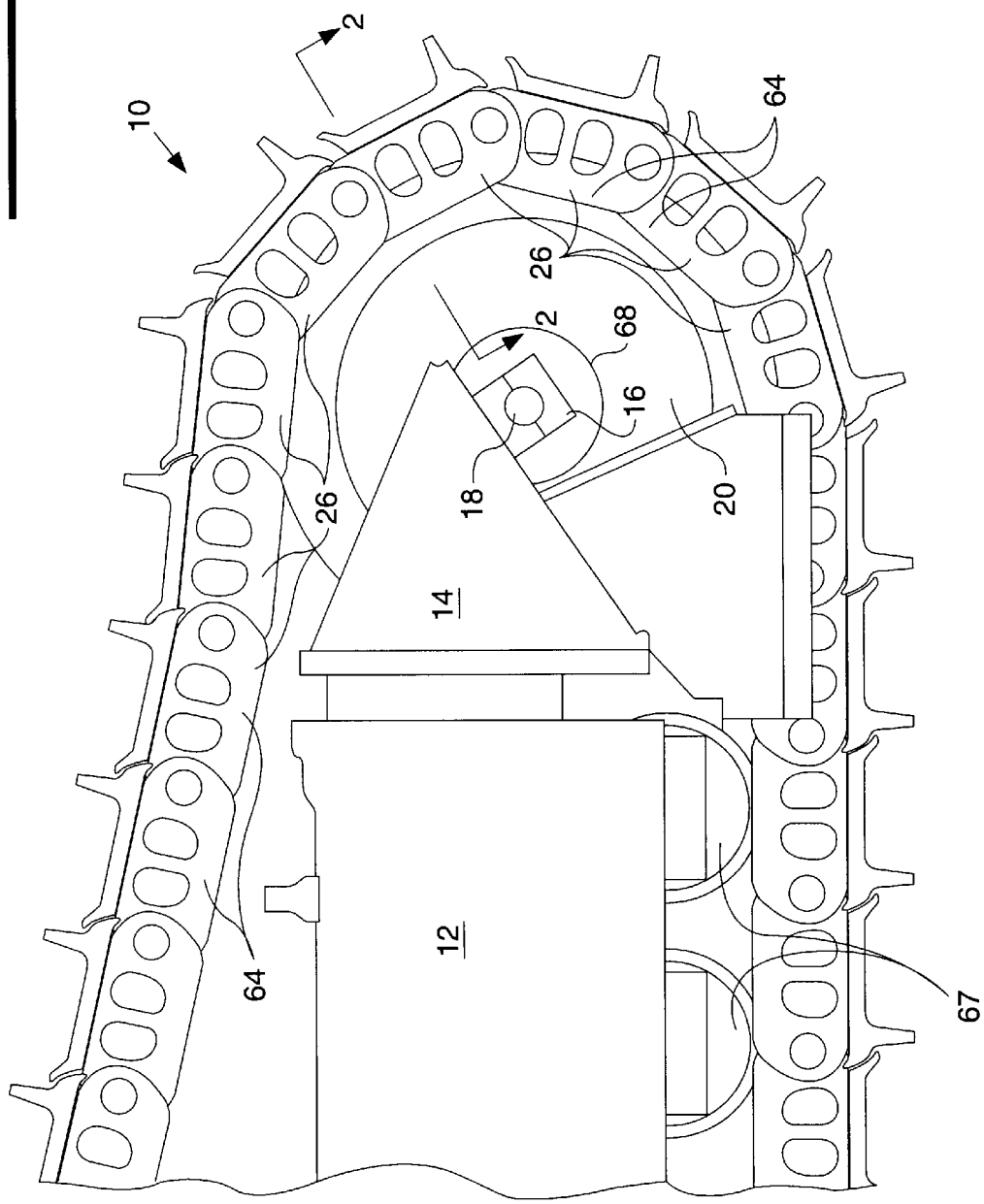
FIG. 1 is a diagrammatic, fragmentary side view of a portion of a track assembly that embodies the principles of the present invention.

Referring to the drawings, it can be seen that a track assembly is shown generally at 10. The track assembly includes a frame member 12, in the form of a track roller frame, that is mounted to the main frame (not shown) of a machine. A first or forward end portion 14 of the track roller frame 12 is shown that defines a mounting portion 16 such as a pillow block or split mounting flange. The mounting flange 16 receives a mounting shaft 18 of an idler member 20 which will be described in greater detail hereinafter. The idler 20 is mounted to the track roller frame for rotation with respect thereto. It is to be understood that, while not shown in the present illustration, a second idler may be mounted to a second end portion of the track roller frame in an essentially identical manner as that described above.

Figure 2:
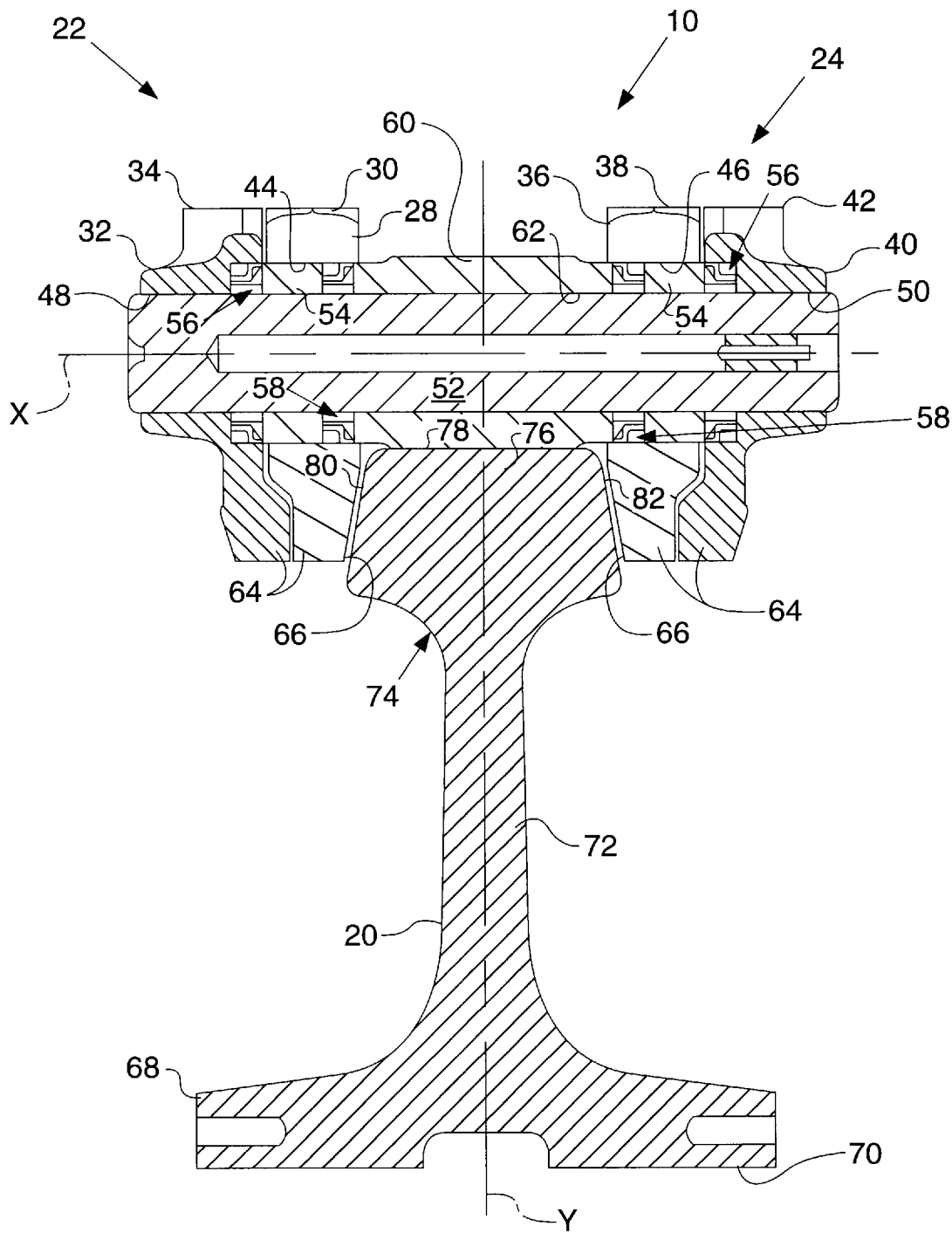
FIG. 2 is a diagrammatic, cross-sectional view taken along lines 2—2 of FIG. 1.

The track assembly 10 includes a pair of chain assemblies 22 and 24. Each chain assembly is comprised of a plurality of substantially identical link members 26 that are pinned together in end-to-end fashion to form the respective chain assemblies. As is best seen in FIG. 2, a pair of adjacent links are shown pinned together in cross-section. The first chain assembly 22 shown on the left side of the drawing shows a first end portion 28 of a first link 30 spaced laterally inward from a second end portion 32 of a second link 34. Likewise, on the right side of the assembly shown in FIG. 2, the second chain assembly 24, whose links are mirror images of the links in the first chain assembly, shows first end portion 36 of a first link 38 spaced laterally inward from a second end portion 40 of a second link 42 in that chain assembly 24.

The first end portions 28 and 36 of the respective first links 38 and 42 define a pair of respective bores 44 and 46 that are aligned with one another along a common centerline X. The second end portions 32 and 40 of the second links 34 and 42 of the respective chain assemblies 22 and 24 also define a bore 48 and 50 that is also aligned along the centerline X. A track pin member 52 is received within the aligned bores and is secured to the second end portions 32 and 40 of the links 34 and 42 by press-fit or similar manner that will securely fasten the pin member thereto. A sleeve bearing 54 is press-fit into the bores 44 and 46 of the links 30 and 38 and provides a sealing face for a track seal 56 which is positioned on one side of the sleeve bearing 54 to seal a portion of the track assembly in a well known manner. The sleeve member 54 also works in conjunction with the bores 44 and 46 to form a portion of a seal cavity for a second seal 58. The second seal bears against a face defined by a bushing member 60, which will be described in more detail hereinafter, and also functions to seal a portion of the track assembly.

The bushing 60 defines a bore 62 that is slightly larger than the outer diameter of the pin member 52 and is positioned about the pin member between the first end portions 28 and 36 of the links 30 and 38. The bushing member 60 is free to rotate with respect to the pin member 52 and the links 30 and 38.

Each link 30, 34, 38 and 42 of the respective track chains defines an inwardly directed wear rail 64, which is best shown in FIG. 2. The wear rails, in turn, define an inwardly directed surface 66 that is tapered outwardly from the bushing member 60. The wear rail is designed to provide a surface which engages a plurality of guide rollers 67 which are mounted along a lower run of the track roller frame.

The idler member 20 defines a centrally disposed hub portion 68 that defines a bore 70 that receives the mounting shaft 18 to facilitate the rotatable mounting to the track roller frame as previously described. A connecting web 72, which is substantially centered along a longitudinal centerline Y, that extends generally vertically and is substantially centered between the two chain assemblies 22 and 24. The connecting web extends radially outwardly from the hub portion and terminates in a flange member 74 that defines a raised center portion 76. As can be seen in FIG. 2, the center portion defines an outer contact surface 78 that has a width that is substantially equal to that of the roller bushing 60 and is just wide enough to fit between the inner portions of the links of the respective track chains. The raised center flange, defines a pair of side portions 80 and 82 that are tapered an amount that is substantially equal to the taper defined by the wear rails of the track links and is positioned in closely adjacent proximity to the opposing track links. While the side portions of both the raised center flange of the idler and the side portions of the wear rails are shown to be tapered, it is to be understood that these respective side portions could also be generally vertical without departing from the scope of the present invention.

Figure 3:
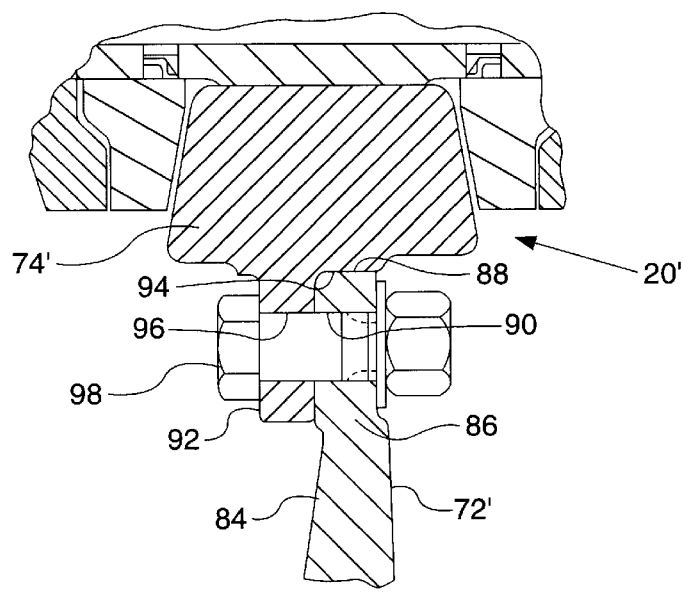
FIG. 3 is a diagrammatic cross-sectional view, similar to FIG. 2 showing an alternate embodiment of the present invention.
Figure 4:
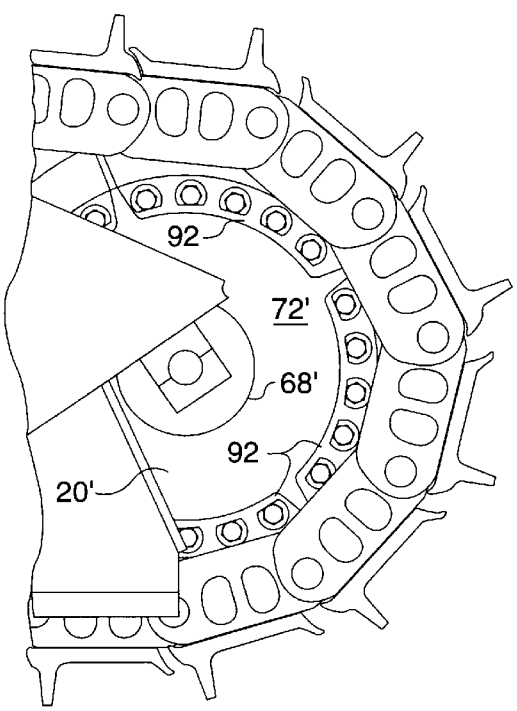
FIG. 4 is a diagrammatic, fragmentary side view of a portion of a track assembly, similar to that of FIG. 1 showing the segmented idler of FIG. 2.

Turning now to FIG. 3, an alternate embodiment of the idler member, indicated as 20' is shown. The construction of the idler member 20' is substantially the same as idler member 20 with the main difference occurring in the connecting web that extends between the flange member and the hub. The connecting web defined by idler 72' includes a first connecting flange 84 that extends radially from the hub portion 68'. The first connecting flange 84 terminates in a shoulder portion 86 that defines an outwardly directed, axially extending surface 88. The shoulder portion defines a plurality of mounting bores 90 that are radially disposed about the shoulder. A second connecting web 92 extends radially downward from the flange member 74' and defines an inwardly directed, axially extending surface 94 that is sufficient in size to engage the axially directed surface 88 defined by the shoulder 86. The second connecting web 92 also defines a plurality of mounting bores 96 that are positioned in registry with the mounting bores 90 defined in the shoulder 86. The aligned bores are sufficient to receive removable fasteners 98 such as a nut and bolt assembly. Being so constructed, the two-piece connecting web configuration lends itself to expedited assembly and disassembly. It is also within the scope of this embodiment to provide a flange member having multiple segments, as is shown in FIG. 4, to further expedite assembly and disassembly.

While not specifically shown in the instant disclosure, it is to be understood that sound deadening material may be inserted between the respective portions of the two-piece connecting web in one of a plurality of well known manners, to reduce the transmission of vibration throughout the track assembly thereby reducing the noise that typically can result in the operation of a track-type machine.

Industrial Applicability

When assembled, the track assembly 10 is entrained about the track roller frame 12 in a manner wherein the raised center portion 76 of the outer flange 74 of the idler member 20 is positioned between the link members 26 of the respective chain assemblies 22 and 24. Being so positioned, the contact surface 78 defined by the raised center portion 76 is in direct contact with the roller bushing 60. In addition, the tapered side portions 80 and 82 defined by the raised center portion are positioned immediately adjacent the tapered guide surfaces 66 defined by the links. The tapered side portions 80 and 82 are positioned in close proximity to the side rails and act as lateral guides for the track assembly 10.

Since the roller bushing 60 is allowed to rotate with respect the pin member 52 and the links, the wear between them and the idler member 20 is greatly reduced. Further, the wear rails 64 defined by the links are not brought into contact with the idler or any other structure as the track chains rotate around the idler. Since the flat surface of the wear rails 64 is not in contact with the circular idler member, there is no tendency for the wear surfaces to be worn to an arcuate configuration. This maintains a relatively flat surface that forms a platform for the track rollers 67 as they move across the wear rails as they contact the ground. This ultimately results in a smoother ride for the operator of the machine which is less fatiguing over the course of a shift, making him more productive in his operation of the machine.

Other aspects, objects and advantages of this invention can be obtained from a study of the drawings, the disclosure and the appended claims.

I claim:

1. An undercarriage assembly for use with a track type machine, comprising:

a frame member having a plurality of rollers mounted thereon;

a track assembly defined by a pair of continuous chain assemblies, each chain assembly having a plurality of link members that have a wear rail defined thereon, said link members being pinned together by a plurality of track pins that interconnect the chain assemblies in spaced relation to one another, said track assembly being entrained about the frame member for rotation thereabout with the wear rails of the link members positioned for rolling contact with the rollers mounted on the frame;

a plurality of roller bushings mounted about the track pins for rotation relative thereto and being positioned between the links of the respective chain assemblies;

an idler member having an outwardly directed flange and being rotatably mounted to an end portion of the frame member with the flange portion thereof positioned between the link members of the respective chain assemblies and in rolling contact with the roller bushings that extend therebetween.

2. The undercarriage assembly as set forth in claim 14 wherein the idler member defines a raised center portion that is connected to a hub portion by a centrally disposed connecting web that is substantially aligned with a centerline that passes through a midpoint defined by the track assembly.

3. The undercarriage assembly as set forth in claim 2 wherein the raised center portion of the flange member defines a pair of tapered side portions, said tapered side portions being positioned adjacent the respective link members of the respective chain assemblies to guide the track assembly in a lateral direction.

4. The undercarriage assembly as set forth in claim 2 wherein the raised center portion of the flanged member and a connecting web extending between the center flange portion and the hub are a formed of a unitary member.

5. The undercarriage assembly as set forth in claim 2 wherein the hub portion defines a first connecting flange that extends radially therefrom and terminates in an axially offset shoulder portion.

6. The undercarriage assembly as set forth in claim 5 wherein the raised center portion of the flange member defines a second connecting web that is adapted to engage the offset shoulder portion in a manner to receive a plurality of removable fasteners to secure the flange member to the first connecting flange.

7. An undercarriage assembly, comprising:

a frame assembly having first and second end portions and a plurality of track rollers mounted thereon between said end portions;

a first track chain defining a plurality of link members having a wear rail portion defined thereon;

a second track chain defining a plurality of link members having a wear rail portion defined thereon;

a plurality of pin members extending laterally between the link members of the respective track chains to connect the first and second track chains together in spaced, parallel relation to one another to form a track chain assembly that is entrained about the frame assembly with the wear rail portions of the link members of the first and second track chains in rolling contact with the track rollers;

a plurality of roller bushings rotatably disposed about each of the pin members, said roller bushings being mounted for relative rotation with respect to the pin members;

at least one idler member having a flange member defined on an outer portion thereof defining a raised center portion thereon and being mounted on at least one of the first and second end portions of the frame assembly, said idler member being adapted for positioning between the link members of the first and second track chains with the raised center portion thereof in engagement with the roller bushings to guide the track chain assembly for relative movement with respect to the frame assembly.

8. The undercarriage assembly as set forth in claim 7 wherein the frame assembly defines a midpoint through which extends a longitudinal centerline.

9. The undercarriage assembly as set forth in claim 8 wherein the track assembly defines a midpoint through which a centerline extends and is mounted for rotation about the frame assembly in a manner wherein the centerline of the track assembly is substantially aligned with the longitudinal centerline of the frame assembly.

10. The undercarriage assembly as set forth in claim 7 wherein the flange member extends from a central hub portion and is positioned on a terminal portion of a radially extending connecting web that is generally aligned with the longitudinal centerline defined by the frame assembly.

11. The undercarriage as set forth in claim 10 wherein the flange member is connected to the central hub portion by a two-piece connecting web.

12. The undercarriage assembly as set forth in claim 7 wherein the wear rails defined by each of the link members have an inwardly directed, tapered guide surface.

13. The undercarriage assembly as set forth in claim 12 wherein the flange member defines a pair of side portions having a taper substantially parallel to that of the guide portions defined by the wear rails of the link members, said flange member being positioned between the link members with the side portions thereof adjacent the tapered guide surfaces to provide guiding for the track chain in a lateral direction.

\* \* \* \* \*

UNITED STATES PATENT AND TRADEMARK OFFICE
CERTIFICATE OF CORRECTION

PATENT NO. : 5,829,849
DATED : November 3, 1998
INVENTOR(S) : Roger E. Lawson

It is certified that error appears in the above-identified patent and that said Letters Patent is hereby corrected as shown below:

On the title page, item [54] Title, should read:

UNDERCARRIAGE ASSEMBLY FOR A TRACK-TYPE MACHINE

Please correct the claims as follows:

Column 5, line 18, delete "14" and insert --1--

Signed and Sealed this

Seventh Day of December, 1999

Q. TODD DICKINSON

Attest:

Attesting Officer

Acting Commissioner of Patents and Trademarks